United States Patent [19]

Phelan

[11] 4,390,072
[45] Jun. 28, 1983

[54] DRILL BIT LUBRICANT CIRCULATION SYSTEM

[75] Inventor: Charles M. Phelan, Fort Worth, Tex.

[73] Assignee: Globe Oil Tools, Inc., Fort Worth, Tex.

[21] Appl. No.: 259,860

[22] Filed: May 4, 1981

[51] Int. Cl.³ .............................................. E21B 10/24
[52] U.S. Cl. ....................................... 175/229; 384/93
[58] Field of Search ....................... 175/227, 228, 229; 308/8.2

[56] References Cited

U.S. PATENT DOCUMENTS

| | | | |
|---|---|---|---|
| 3,841,422 | 10/1974 | Crow | 175/229 |
| 3,990,525 | 11/1976 | Penny | 308/8.2 X |
| 4,183,416 | 1/1980 | Walters | 308/8.2 X |
| 4,284,151 | 8/1981 | Levefelt | 175/227 |

*Primary Examiner*—Stephen J. Novosad
*Assistant Examiner*—Joseph Falk
*Attorney, Agent, or Firm*—Hubbard, Thurman, Turner & Tucker

[57] ABSTRACT

Discloses a lubricant circulating system for a rotary drilling bit including a lubricating space defined between a rotary cone cutter and a journal shaft extending from the bit body, the body defining a lubricant supply passageway connecting the lubricating space with a substantially cylindrical inlet chamber of a lubricant reservoir and with the centerline of the supply passageway being disposed substantially tangential with the cylindrical wall of said inlet chamber to form a restrictive vortex flow passage from the supply passageway into said reservoir and a nonrestrictive return flow passage, the body defining a lubricant exhaust passageway connecting the lubricating space through a substantially cylindrical outlet chamber into a discharge passageway forming part of the reservoir and with the centerline of the discharge passageway being disposed substantially tangential with the cylindrical wall of the outlet chamber to form a restrictive vortex flow passage from the reservoir into the outlet chamber and exhaust passageway and a non-restrictive return flow passage. Repeated volumetric variations in the lubricating space cause lubricant flow in the direction of least flow restriction which is from the reservoir into the inlet chamber, through the lubricating space and out of the discharge passage to the reservoir.

8 Claims, 4 Drawing Figures

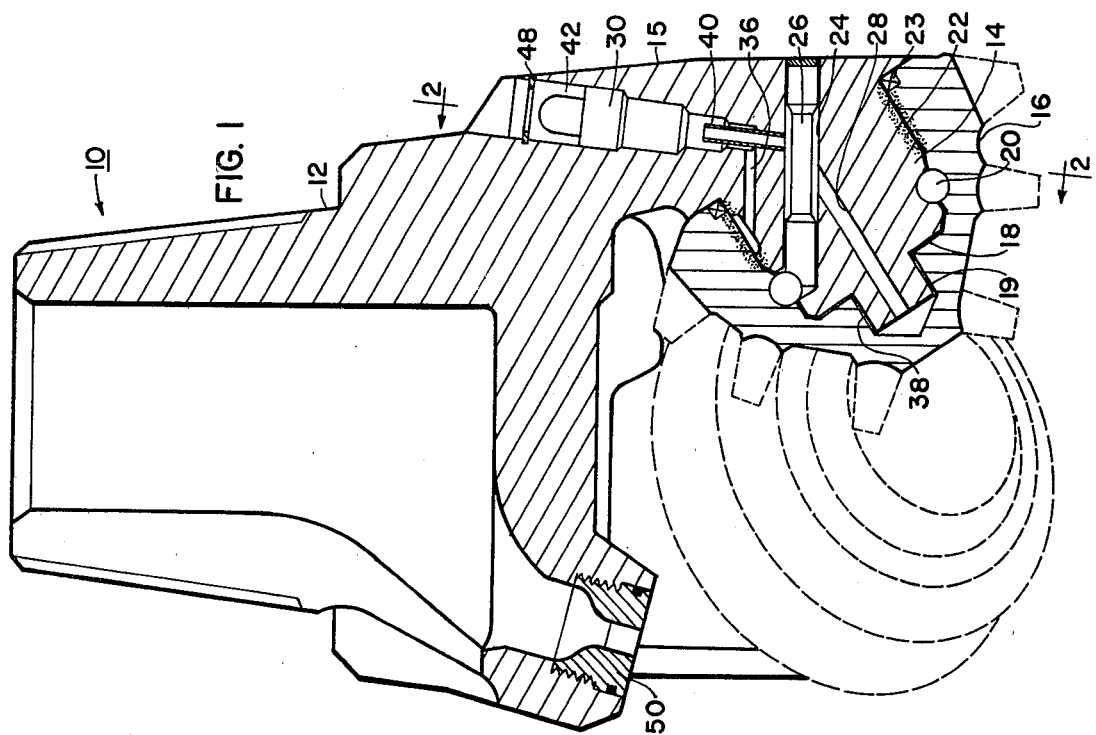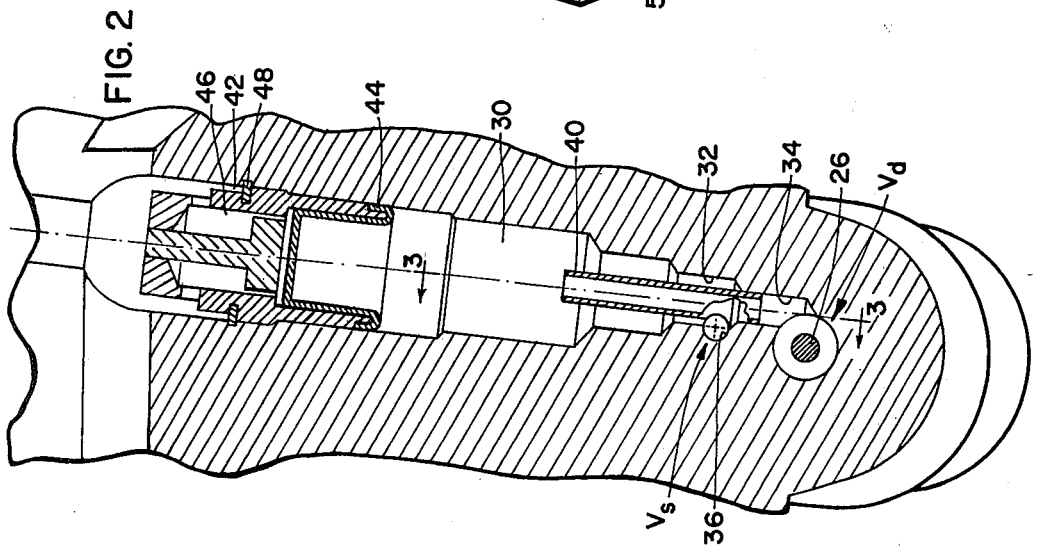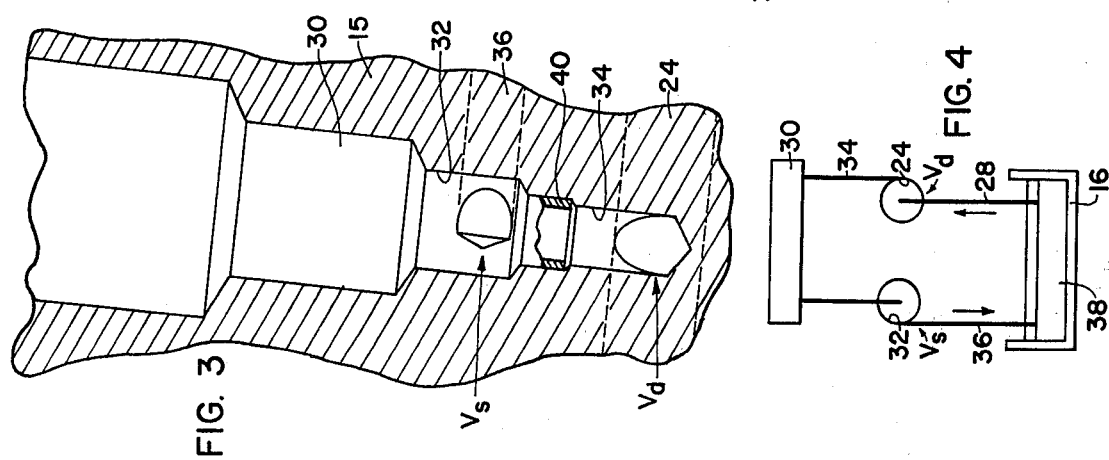

DRILL BIT LUBRICANT CIRCULATION SYSTEM

This invention generally pertains to sealed bearing rotary drilling bits and more particularly pertains to a lubricant circulation system for each rotatable cone cutter of a drilling bit.

BACKGROUND OF THE INVENTION

The present invention is an improvement to rotary bit lubrication systems such as disclosed in the prior art U.S. Pat. No. 3,841,422 to Crow. Of the known prior art, the Crow patent is the nearest to the present invention.

The Crow patent discloses a bit body defining a lubricant reservoir, a bearing lubricating area, a first lubricant passageway including a mechanical check valve for providing one-way flow of lubricant from the reservoir to the bearing area, and a second lubricant passageway including a mechanical check valve for providing one-way flow of lubricant from the bearing area back to the reservoir. The two check valves, with the cone cutter as a pump, serve as pump valves to circulate lubricant through the bearing space.

OBJECTS OF THE INVENTION

A principal object of the present invention is to provide positive circulation of lubricant through the lubricating space of a rotary bit cone cutter without the need for mechanical valves.

Another object of the present invention is to provide a cone cutter lubricant circulation system which provides effective lubricant circulation yet avoids the expense and complications of providing mechanical valves in the manufacture of the drilling bit.

Yet another object of the invention is to use the volumetric change of the lubricating space between the cone cutter and the drilling bit journal, as caused by many thousands of repeated strains on the bit during the drilling operation, to urge lubricant to circulate through the bearing lubricating space without mechanical valves.

SUMMARY OF THE INVENTION

The foregoing and other objects and advantages of the present invention are attained by a lubricant circulation system for a rotary drilling bit including a lubricating space defined between a rotary cone cutter and a journal shaft extending from the body of the bit. The body defines a lubricant supply passageway connecting the lubricating space with a substantially cylindrical inlet chamber of a lubricant reservoir. The centerline of this supply passageway is disposed substantially tangential with the cylindrical wall of such inlet chamber to form a first restrictive vortex flow passage from the supply passageway into such reservoir and a less restrictive return flow passage with such arrangement being analagous to a fluidic diode. The bit body further defines a lubricant exit passageway connecting the lubricating space through a substantially cylindrical outlet chamber into a discharge passageway forming part of such reservoir where the centerline of such discharge passageway is disposed substantially tangential with the cylindrical wall of such outlet chamber to form a second restrictive vortex flow passage from such reservoir into the outlet chamber and discharge passageway and a second less restrictive return flow passage with this structure also being analagous to a fluidic diode. The arrangement of the reservoir, the first vortex flow passage, the bearing lubricating space, and the second vortex flow passage, as provided, causes lubricant flow in the direction of least flow restriction, in response to repeated volumetric variations of the lubricating space, which circulates the lubricant from the inlet chamber of the reservoir into the supply passageway, through the lubricating space and out of the discharge passageway back into the reservoir.

BRIEF DESCRIPTION OF THE DRAWING

FIG. 1 is a partially schematic longitudinal cross section of a conventional rotary drilling bit illustrating the lubricant circulation system for one of the three cone cutters utilized with the particular style of bit shown;

FIG. 2 is a sectional view taken along the line 2—2 of FIG. 1 and illustrating the lubricant reservoir and intake and discharge passageways through which lubricant is circulated through the bearing lubricating space of the respective cone cutter;

FIG. 3 is a partial section taken along the line 3—3 of FIG. 2 and showing another view of the supply and discharge passageways in more detail; and FIG. 4 is a schematic illustration of the hydraulic circuit of the lubricant from the reservoir through the intake or supply passageways, into the bearing lubricating space, and out through the discharge passageways into the reservoir.

DESCRIPTION OF THE PREFERRED EMBODIMENT

An seen in FIG. 1 of the drawing, the invention is embodied in a rock bit 10 having a body 12 which is divided at its lower end into three arms such as arm 15. Arm 15 is seen to terminate in a respective journal shaft such as journal shaft 14. Rotatably mounted on the journal shaft 14 is a cone cutter 16 which is one of three such cone cutters provided with the bit 10.

At the left of FIG. 1 is shown a jet nozzle 50 threadedly connected into an arm of the body 12 and in communication with the central passageway of the bit 10.

It is to be noted that the bit 10 employs three cone cutters such as cutter 16. However, some bits which utilize the present invention may have only two such cone cutters.

It is also to be noted that the cone cutter 16 is schematically shown equipped with machined cutter teeth. The cutter 16 may also employ other cutting structures such as tungsten carbide inserts or buttons which are pressed into holes drilled into the cutter 16.

The cutter 16 is journalled about the journal shaft 14 on bearings schematically shown as hardened surfaces between cone 16 and shaft 14 forming a thrust bearing 18 and a sleeve bearing 19, a series of ball bearings 20, and hardened bearing surfaces on the journal shaft 14 and within the cutter 16 which form a sleeve bearing 22.

Extending from the end of journal shaft 14 through the shaft into communication with ball passageway 24 is a shaft passageway 28.

For purpose of identification, the volume or space between the cone cutter 16 and the journal shaft 14 (such as between the bearing surfaces of bearing 22, the balls of bearing 20, and the related cavities between the bearings) is designated a bearing lubricating space 38.

A rotary seal 23 of known design is provided between the shaft 14 and cutter 16 to confine the lubricant within the space 38.

In the assembly of the cone cutter 16 onto the journal shaft 14, the cutter is mounted in sealed relation on the shaft as shown with the thrust bearing 18 and the sleeve bearing 22. The respective balls of the bearing 20 are then inserted through a ball passageway 24 as shown, one at a time, until the prescribed number of balls are entered into the bearing race defined by the journal shaft 16 and cutter 16.

The ball passageway 24 is then closed by a cylindrical ball retainer plug 26 as shown with a portion of the end of the retainer plug being machined to form a portion of the bearing race of the journal shaft 14.

As can be seen, the retainer plug 26 has been undercut between its ends to form a cylindrical annulus or flow chamber in the ball passageway 24 for use as described below.

The ball retainer plug 26, once installed and positioned properly, is hermetically sealed into place as by welding.

Now referring to FIG. 2 in view of FIG. 1, there is shown a reservoir chamber 30 defined by the body 12 and extending upwardly from the ball passageway chamber 24.

A discharge passageway 34 is seen to extend downwardly from reservoir 30 into communication with the passageway chamber 24.

A supply passageway 36 is seen to extend laterally from the intake passageway 32 of reservoir 30 into communication between the bearing surfaces of the sleeve bearing 22 into the lubricating space 38.

FIG. 4 schematically illustrates the lubricant circulation hydraulic circuit as shown in FIG. 1 and partially shown in FIGS. 2 and 3. Shown in FIG. 4 are the cone cutter 16 and journal shaft 14 which define the bearing lubricating space 38. The passageway 28 extends into the passageway chamber 24 and the discharge passageway 34 extends in communication from reservoir 30 into the passageway chamber 24. The intake passageway 32 is seen to extend in communication from the reservoir 30 into the supply passageway 36 and thereon into the lubricating space 38.

Referring now to FIGS. 2 and 3, the arm 15 is machined such that the centerline of the supply passageway 36 is disposed to be on a tangent of the cylindrical inner wall of the cylindrical intake passageway 32. When so provided, fluids flowing from the supply passageway 36 into passageway 32 will tend to flow in a vortex fashion about the inner wall of the passageway 32 and thereby create some impediment to flow coming from supply passageway 36.

Conversely, fluid flowing from the intake passageway 32 into the supply passageway 36 flows directly from the passageway 32 into the passageway 36 with less resistance as compared by the vortex action previously described. Thus, it is seen that the flow from the reservoir 30 through the intake passageway 32 and the supply passageway 36 is with less impediment or resistance to flow than any return flow from passageway 36 into the intake chamber 32.

The arrangement and disposition of the chamber 32 and passageway 36 may be envisioned as a fluidic diode wherein flow in one direction meets with some resistance and flow in the other direction meets less resistance to the extent that the difference in flow resistance is useful in the performance of the present invention.

Referring now to FIGS. 2 and 3, taken in view of FIG. 1, it is seen that the centerline of the discharge passageway 34 has been machined so as to be disposed on a tangent with the cylindrical inner surface of the passageway chamber 24. Thus, flow through the discharge passageway 34 into the chamber 24 will create a vortex action around the inner wall of the passageway 24 and thereby create a resistance to such flow.

Conversely, flow through the passageway 28 and the chamber 24 into the discharge passageway 34 is direct and creates no vortex action which would tend to cause a resistance to flow. Thus, the combination of the discharge passageway 34 and chamber 24, as disposed, is provided to create a flow arrangement somewhat analagous to a fluidic diode whereby, the flow from the passageway 24 into the passageway 34 meets with little resistance whereas the flow of fluids from the passageway 34 into the chamber 24 would create such flow resistance as caused by the vortex action of the fluid flow.

The vortex provided by the co-action of passageway 36 and chamber 32 is identified as supply vortex $V_s$ and the vortex provided by the co-action of the chamber 24 and passageway 34, as shown, is identified as discharge vortex $V_d$.

The intake passageway 32 is separated from the discharge passageway 34 within the reservoir 30 by means of a dischage pipe 40 which is fitted into the upper end of discharge passageway 34 so as to extend upwardly into the reservoir 30.

It is seen, with reference to FIGS. 1 and 4, that a complete hydraulic circuit is provided for circulating lubricant through the lubricating space 38 from the reservoir 30 through intake passageway 32, the supply passageway 36, the lubricating space 38, the shaft passageway 28, the passageway chamber 24, the discharge passageway 34, and the tube 40 back into the reservoir 30.

The upper end of reservoir chamber 30 is closed by means of a pressure balanced retainer cap 42 which carries a flexible diaphram 44 which in turn is supported against pressure from within the chamber 30 by means of a support plug 46 joined as part of the retainer cap 42. The assembly of the retainer cap 42 is secured within the upper end of the reservoir 30 by means of a snap ring 48.

As shown, the reservoir 30, when filled with lubricant, is carried at the same pressure through the vented retainer cap 42 as the pressure exterior of the bit 10. Such pressure may be the drilling mud at the bottom of a well bore, for example.

CONSTRUCTION AND OPERATION OF THE INVENTION

The rotary bit 10 is assembled as generally shown in FIGS. 1 and 2. Lubricant may then be introduced to the reservoir 30 through pipe 40 and the previously described circulation system before closing the reservoir with the assembly of cap 42.

Provision of the pipe 40, shown, as part of the lubricant circulation system, may be seen to facilitate change of lubricant by the operator in the field. To change the lubricant, one need only to remove the assembly of the retainer cap 42 by removal of the snap ring 48. New lubricant may then be manually injected down through the pipe 40, passageway 34, chamber 24, passageway 28, lubricating space 38, passageway 36, and back into the reservoir 30 so that when the reservoir 30 is filled, the operator is insured that new lubricant has been completely circulated through the lubrication circulating system.

When the rotary bit 10 is placed in operation at the bottom of a drilling string, the cone cutters are rotated under tremendous weight, causing slight axial motion of cone cutter 16 and a consequent repeated small change in volume of the lubricating space 38. As the lubricating space 38 decreases in volume, then lubricant tends to be extruded through both the passageways 28 and 36, then drawn back by an increase in volume.

The passageway 28, in co-action connection with the chamber 24, forms the vortex $V_d$. The passageway 36, in co-acting connection with the intake passageway 32, forms the vortex $V_s$. The action of the vortex $V_s$ is to restrict fluid flow coming into chamber 32 from passageway 36. The action of the vortex $V_d$ is to restrict the flow of lubricant from the passageway 34 into the chamber 24 to an effective extent. The reverse flow through vortexes $V_s$ and $V_d$ is less impeded.

Thus, a small net directional flow action occurs which, though very small, is effective through the many thousands of volumetric changes caused by the cone cutter 16. In due course, all the lubricant in reservoir 30 is circulated, then re-circulated, through the bearing lubricating space 38.

It is to be noted that the system of the present invention, though most efficient with provision of the two vortexes $V_s$ and $V_d$ as shown, would be operable with provision of only one of such vortexes, such as vortex $V_s$, for example. Of course the invention would also be operable with provision of only the vortex $V_d$.

The positive circulation of lubricant through the bearing lubricating space 38 extends the life of the bearing much greater than with no such circulation, as is well known in the art.

It will be obvious to those skilled in the art that changes and modifications to the disclosed embodiment may be made, all within the spirit of the present invention and as come within the scope and purview of the appended claims.

I claim:

1. A lubricant circulating system of each rotary cone cutter of a rotary drilling bit comprising:
   (a) a sealed bearing lubricating space defined between said rotary cone cutter and a journal shaft extending from the body of said bit with said cutter and said shaft co-acting during use of said bit to cause repeated changes in volume of said lubricating space;
   (b) said body defining a lubricant reservoir in communication with said lubricating space through an inlet passageway and an outlet passageway;
   (c) at least one of said passageways including connection with a substantially cylindrical chamber;
   (d) the centerline of said one passageway being disposed substantially tangential with the cylindrical wall of said chamber to define a vortex flow passage providing flow restriction from said passageway into said cylindrical chamber and less restrictive return flow; and
   (e) said vortex flow passage co-acting with repeated volume variations in said lubricating space to cause lubricant flow circulation in the direction of least flow restriction.

2. The system of claim 1 wherein lubricant is continuously circulated from said reservoir through said bearing circulating space while said drilling bit is drilling earth formation.

3. The system of claim 1 wherein said vortex flow passage is analagous in operation to a fluidic diode.

4. The system of claim 1 further including means to supply lubricant from said reservoir into said lubricating space at a location spaced apart from the location where lubricant is returned to said reservoir.

5. The system of claim 4 wherein said locations are spaced apart by a pipe mounted in said reservoir and connected in communication with one of said passageways.

6. The system of claim 1 wherein each of said passageways includes connection with respective substantially cylindrical chambers and with the centerline of each said passageway being disposed substantially tangential with the cylindrical wall of its respective chamber to define a vortex flow passage providing flow restriction from said passageway into said chamber and less restrictive return flow.

7. The system of claim 6 wherein each of said vortex flow passages is analagous in operation to a fluidic diode.

8. The system of claim 6 further including means to withdraw lubricant from said reservoir at a location spaced apart from the location where lubricant is returned to said reservoir and wherein said locations are spaced apart by a pipe mounted in said reservoir and connected in communication with one of said passageways.

* * * * *